(12) United States Patent
Carey

(10) Patent No.: US 9,879,927 B2
(45) Date of Patent: Jan. 30, 2018

(54) SYSTEM AND METHOD OF HEAT EXTRACTION FOR PREVENTING OR MITIGATING A LANDFILL SUBSURFACE REACTION

(71) Applicant: BRIDGETON LANDFILL, LLC, Bridgeton, MO (US)

(72) Inventor: Peter J. Carey, Sugar Hill, GA (US)

(73) Assignee: Bridgeton Landfill, LLC, Bridgeton, MO (US)

( * ) Notice: Subject to any disclaimer, the term of this patent is extended or adjusted under 35 U.S.C. 154(b) by 0 days.

(21) Appl. No.: 15/275,351

(22) Filed: Sep. 24, 2016

(65) Prior Publication Data

US 2017/0087607 A1     Mar. 30, 2017

Related U.S. Application Data

(60) Provisional application No. 62/233,005, filed on Sep. 25, 2015.

(51) Int. Cl.
| | | |
|---|---|---|
| *B09B 1/00* | (2006.01) | |
| *F28D 15/00* | (2006.01) | |
| *F28F 21/04* | (2006.01) | |
| *F28F 27/00* | (2006.01) | |
| *F24J 3/08* | (2006.01) | |
| *F28D 21/00* | (2006.01) | |

(52) U.S. Cl.
CPC ............. *F28F 27/00* (2013.01); *B09B 1/006* (2013.01); *F24J 3/084* (2013.01); *F28D 21/0001* (2013.01); *F24J 2003/089* (2013.01); *F28F 2200/00* (2013.01)

(58) Field of Classification Search
CPC ................ B09C 1/00; B09C 1/02; B09C 1/06
USPC ........................................ 405/129.29, 129.95
See application file for complete search history.

(56) References Cited

U.S. PATENT DOCUMENTS

| | | |
|---|---|---|
| 5,888,022 A | 3/1999 | Green |
| 6,742,962 B2 | 6/2004 | Hater et al. |
| 7,992,403 B2 | 8/2011 | Kim et al. |
| 8,459,984 B2 | 6/2013 | Duesel, Jr. et al. |
| 8,672,586 B2 | 3/2014 | Yesiller et al. |
| 8,813,514 B2 | 8/2014 | Wong |
| 8,872,022 B2 | 10/2014 | Hyde et al. |
| 9,140,499 B2 | 9/2015 | Hyde et al. |
| 9,255,727 B2 | 2/2016 | Yesiller et al. |
| 9,284,952 B2 | 3/2016 | Peele |

(Continued)

*Primary Examiner* — Tara Mayo-Pinnock
(74) *Attorney, Agent, or Firm* — Lathrop Gage L.L.P.

(57) ABSTRACT

Disclosed is a system for preventing or mitigating elevated temperatures within a landfill. The system comprises at least one water tight heat exchange unit with a lower edge and an upper edge, wherein the placement of the heat exchange unit is at least one of (1) within the waste mass proximate the area of elevated temperature, or (2) within the area of elevated temperature, the at least one heat exchange unit fabricated to resist differential settlement forces within the landfill as well as the elevated temperatures. The system further includes piping configured to discharge a cooling fluid within the heat exchange unit and a heat exchanger for ejecting heat from the cooling fluid and at least one temperature probe configured to measure the temperature of the waste mass. The system utilizes a pump adapted to circulate the cooling fluid within the piping system and to the heat exchange unit.

31 Claims, 8 Drawing Sheets

(56) References Cited

U.S. PATENT DOCUMENTS

| | | |
|---|---|---|
| 9,285,140 B2 | 3/2016 | Melink |
| 9,435,569 B2 | 9/2016 | Yesiller et al. |
| 2002/0018697 A1* | 2/2002 | Vinegar ............... B09C 1/062 405/128.55 |
| 2004/0120771 A1* | 6/2004 | Vinegar ............... B01D 53/002 405/128.4 |
| 2004/0120772 A1* | 6/2004 | Vinegar ............... B09C 1/00 405/128.85 |
| 2010/0254766 A1 | 10/2010 | Park et al. |
| 2011/0024077 A1 | 2/2011 | Asai et al. |
| 2012/0255706 A1 | 10/2012 | Tadayon et al. |
| 2013/0025825 A1* | 1/2013 | Yesiller ............... F25B 27/02 165/104.13 |
| 2014/0110082 A1 | 4/2014 | Suver |
| 2014/0353864 A1 | 12/2014 | Grochoski |
| 2015/0136354 A1* | 5/2015 | Yesiller ............... F24J 3/084 165/45 |
| 2016/0054032 A1 | 2/2016 | Hyde et al. |
| 2016/0146482 A1 | 5/2016 | Peele |
| 2016/0231011 A1 | 8/2016 | Ankeny |

* cited by examiner

SYSTEM AND METHOD OF HEAT EXTRACTION FOR PREVENTING OR MITIGATING A LANDFILL SUBSURFACE REACTION

RELATED APPLICATION

This application claims the benefit of priority of U.S. Application No. 62/233,005 filed on Sep. 25, 2015.

TECHNICAL FIELD

This disclosure relates generally to a system and method of heat extraction for preventing or mitigating a landfill subsurface reaction. A heat transfer fluid is circulated through heat exchange units embedded within the waste mass resulting in the removal of heat energy and the prevention or mitigation of a subsurface reaction.

BACKGROUND

In a typical landfill a portion of the biodegradable material decomposes and eventually is transformed into solid residuals, landfill gas, and/or leachate. Aerobic bacteria initially decompose the waste until the available oxygen is consumed. This stage usually lasts for a short time and is followed by the anaerobic acid state, in which carboxylic acids accumulate, the pH decreases, and some cellulose and hemicellulose decomposition occurs. Finally, during the methanogenic state, bacteria further decompose the biodegradable material into methane and carbon dioxide. These are the typical biological processes by which the waste mass of a landfill decomposes over time. Each of these biological processes generates heat. If a landfill overheats a self-sustaining exothermic reaction may be initiated.

In addition to the biological processes described above, other processes generate heat in the landfill, such reactions include 1) aerobic consumption of waste wherein the cause is often associated with an operational issue such as disposal of hot material and/or the over application of vacuum on a gas extraction well (a typical landfill subsurface "fire"), 2) exothermic chemical reactions such as when water is combined with certain wastes, such as aluminum production wastes, lime, steel mill waste, and other metal wastes, and, 3) anaerobic, pyrolytic reactions which cause thermal decomposition of the waste and may release heat under certain conditions.

Reactions such as those described immediately above are problematic in that they generally produce adverse impacts. These adverse impacts can include odors, smoke, fugitive emissions, liner or cap damage, gas and leachate management structural damage, excessive settlement, slope failure, ground water and/or surface water impacts; and disruption of landfill operations. In addition, subsurface reactions tend to increase leachate generation, sometimes by an order of magnitude, which may result in outbreaks, where excessive leachate exits the waste mass at locations that can create an environmental hazard. As such, controlling the spread of these subsurface reactions is critical to reducing potential landfill air emissions as well as potential adverse impacts to ground and surface waters.

Typical landfill fires (described as stemming from an operational issue above) are extinguished using well-accepted industry standard operating practices which eliminate the oxygen that is needed to sustain the fire. However, the reactions described above as exothermic chemical reactions and pyrolytic reactions occur in the absence of oxygen (anaerobic), so the standard practices for fires do not apply.

There are no easy short term fixes to landfill subsurface pyrolytic reactions and the attendant adverse impacts of those reactions. For example, excavation of the hot waste can result in the threat of fire from the introduction of oxygen and in most cases excavation of the hot waste may not be a feasible option if the subsurface reaction is very deep, extensive or rapidly propagating. Opening a landfill to address the reaction also results in exposing the waste mass to vectors such as birds and rodents that can create a broad set of undesirable ecological impacts. Measures taken to decrease temperatures have been shown to work more rapidly to suppress the subsurface reaction than measures taken to exclude oxygen. Further discussion on this control strategy will be detailed in the Summary section below.

Subsurface reactions can be self-sustaining high-temperature reactions that consume waste underground, producing rapid "settlement" of the landfill's surface. Deep-seated subsurface reactions do not "burn," instead these events are believed to be a form of thermal decomposition known as pyrolysis, under which the thermal reaction takes place in an oxygen starved environment and the reacting material is consumed slowly and at relatively low temperatures. Subsurface reactions are generally defined as the sustained pyrolysis of carbon based material at elevated temperatures accompanied by the evolution of heated gaseous products.

A significant impact of a subsurface reaction is that substantial settlement of the waste mass can occur over a short period of time. This settlement occurs due to the reduction in the volume of the waste mass from pyrolysis of the waste mass resulting in greater than normal settlement over and adjacent to the reacting waste mass. In addition, substantial settlement can occur due to the generation of and dissipation of pressure within the waste mass resulting from the phase change of liquid entrained in the waste mass to vapor phase.

A subsurface reaction can also result in direct impact on engineered components, thermal damage to the engineered components and as discussed above, differential settlement of the engineered components. If the reduction in the waste volume due to the pyrolysis is significant, it can lead to the settlement of the overlying waste materials. Consolidation and settlement of the waste materials can lead to subsidence and differential settlement of the engineered landfill cover. Differential settlement of the engineered landfill cover can result in damage to the cover system which can negatively affect the performance of the landfill cover through desiccation, creation of cracks, or in the extreme complete disruption resulting in offsets in the cover system layers.

Preventing the occurrence, or limiting the advancement of the subsurface reaction is a mechanism for reducing the environmental impacts of the reaction and to reduce the adverse impacts of differential settlement. To limit the movement of the subsurface reaction, heat must be removed from the waste mass thereby retarding or stopping the advance of the heat front, the leading edge of the subsurface reaction as it expands, by stalling or eliminating the exposure to new waste mass to higher temperatures. It is well known in the industry that to accomplish heat removal from a landfill that a piping loop can be installed within the waste mass that circulates temperature treated water or water based solutions. Exemplary of this technique are the disclosures of U.S. Pat. Nos. 8,672,586 and 9,255,727 by Yesiller. In the Yesiller references, the circulation fluid extracts heat as the fluid circulates through the closed-loop, returning the warmer circulation fluid to a heat exchanger for cooling and recirculation. The system and methods disclosed therein are inadequate to address the significant and aggressive differential settlement that occurs within landfills afflicted with a subsurface reaction.

SUMMARY

The disclosed system and method is directed to preventing, or mitigating, a subsurface reaction within a landfill waste mass. In situ landfill temperatures typically range from around 75° to 165° F. Temperatures below 375° F., well below the smoldering combustion range, are observed in waste that is saturated or nearly saturated with water. Combustion does not occur in these conditions. Landfills afflicted with subsurface reactions, or areas of elevated temperature, generally experience considerable differential settlement that could result in damage, or destruction, of cooling loops embedded into the landfill waste mass.

This damage is the result of shifts in the waste mass as settling occurs due to the pyrolysis of layers of waste mass. As stratified areas of the waste undergo pyrolysis, the decomposed remains of the waste are unable to support the weight of the overlain waste and collapse under the pressure. Due to this differential settlement where the elevation of certain areas of the landfill may drop on the order of several feet per month, the thin walled metal or polymer based tubing that is utilized for fluid transfer loops in ground source heat transfer systems are subject to tremendous external forces and specifically radial stresses that can, and often do, collapse the piping thereby rendering the cooling system inoperable. A radial stress is defined in the industry as stress in directions coplanar with, but perpendicular to, the symmetry axis. Additionally, unless the subsurface cooling system is fabricated from materials capable of withstanding the high temperatures associated with the subsurface reaction, the system will quickly degrade and become inoperable if the reaction contracts the heat extraction elements.

There exists an overwhelming need for a system and method to control the advance of the heat front of a subsurface reaction or a means to prevent the initiation of a subsurface reaction. To respond to the challenges associated with subsurface reactions disclosed herein is a system and method for retarding the advancement of a heat front of a subsurface reaction. The same system and method can also be employed to potentially prevent the initiation of a subsurface reaction should there be landfill operational data detailing elevated waste mass temperatures that suggest the initiation of a subsurface reaction is probable.

The system and method disclosed herein includes a rigid tubular casing extending downwardly into the waste mass to a depth within or proximate the subsurface reaction. The system further includes an inlet pipe of a lesser cross sectional dimension than the rigid tubular casing, the inlet pipe having a discharge end and an intake end, the discharge end of the inlet pipe inserted into the rigid tubular casing proximate the end cap. A pump is used to circulate a cooling fluid into the inlet pipe at the intake end for discharge at the discharge end for filling the interior space. A discharge pipe is coupled to the rigid tubular casing for removing cooling fluid in excess of the capacity of the interior space of the rigid tubular casing, and a heat exchanger is utilized for cooling the circulating fluid.

DETAILED DESCRIPTION

Figure 1:
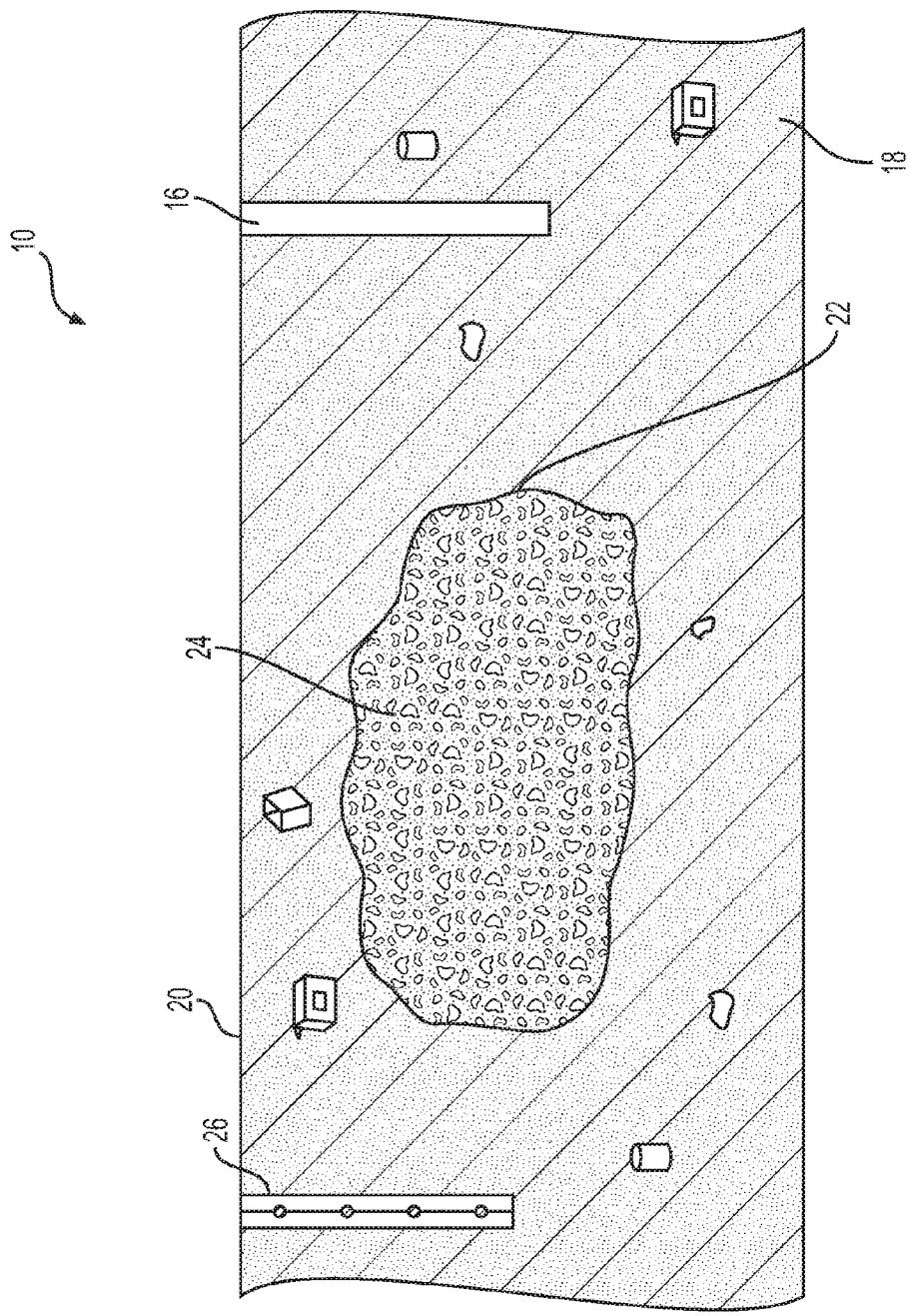
FIG. 1 is a sectional elevation view of an embodiment of landfill waste mass temperature measurement componentry.

The disclosure herein is directed to a system and method for lowering the temperature of a waste mass to prevent, or retard, heat accumulation and/or the spread of excessive heat in the solid waste mass of a landfill. The heat extraction system is operated to deliver a cooling fluid under pressure to each heat extraction point. An equalization tank and an electric system pump are utilized to maintain liquid flow throughout the system. An adequate cooling fluid level is maintained in the equalization tank at all times to supply the system pump.

Prior to installation of any components of the cooling system, the landfill owner or operator may elect to perform numerical modeling of the waste mass and landfill parameters to attempt to accurately determine the amount of energy that must be extracted from the waste mass subsurface reaction in order to prevent the formation of a subsurface reaction or to control the advance of the heat front. The numerical modeling can assist in identifying the preferred location of the installation of specified components of the heat extraction system. Numerical modeling simulations may be run to evaluate the heat energy extracted by the cooling system in various configurations, and locations, thereby facilitating "what if" scenarios to be tested. The modeling of heat flow and removal may be performed by using a modeling program, such as FEFLOW™, developed by DHI-WASY GmbH of Germany and that is commercially available in the United States through MIKE Powered by DHI™. Other simulation programs may also be utilized in the development of these "what if" scenarios.

FEFLOW™ is a finite element based software that allows simulation of heat transport in two and three dimensions. The software allows for steady state and transient modeling of saturated, or partially saturated, media in both a saturated only or saturated/unsaturated system and requires the entry of landfill specific parameters such as waste heat conductivity, waste heat capacity, landfill dimensional data, liquid levels and flow gradient, heat exchange unit borehole parameters; porosity with respect to flow and porosity with respect to heat and internal heat generation among other parameters. A series of model runs may then be executed for purposes of determining the design parameters of the heat exchanger that will be used to eject heat from the cooling fluid.

Three important design criteria for specifying a heat exchanger, such as an evaporative cooling tower, are the maximum design cooling fluid temperature the process requires for cooling, the range between the cooling fluid entering and leaving the tower, and the maximum wet bulb of the air entering the tower. For example, if the climate where a heat exchanger is placed has a maximum outdoor wet bulb temperature of 77° F., and the maximum temperature supply water that the process can tolerate is 85° F., and the temperature of the cooling fluid entering the heat exchanger is 95° F., then the design approach would be the difference between the maximum tolerable process supply cooling fluid and the maximum design wet bulb (85-77)=8° F., and the range would be (95-85) 10° F. In this application, the maximum design heat exchanger approach would be 8° F. This means that a heat exchanger with an approach higher than 8° F. would be undersized and unable to provide sufficiently cooled fluid to the system when outdoor temperatures and heat load are at maximum. Other types of coolers or chillers could be used in place of an evaporative cooler.

As seen in FIG. 1, the heat extraction system 10 utilizes one or more borings 16, and the insertion of a plurality of temperature probes descending into the waste mass 18 within the landfill 20. The boring 16 and the attendant temperature monitoring probes 26, generally thermocouples are utilized, will be positioned proximate the advancing face, or heat front 22, of the subsurface reaction 24 and will be used by the system 10 operator to evaluate the magnitude of energy extraction that is required of the system 10 in order to retard, or possibly even halt, the advance of the heat front 22.

The precise location of the temperature monitoring probe boring 16 is generally determined by analysis of temperature data from other temperature monitoring probes 26 that are spatially dispersed throughout the landfill waste mass 18. These temperature probes 26 may be those utilized by the landfill owner or operator to comply with the U.S. EPA's New Source Performance Standard for municipal solid waste landfills found at 40 C.F.R. § 60 Subpart WWW titled "Standards of Performance for Municipal Solid Waste Landfills" which limits the temperature of collected landfill gas to below 131° F. The landfill owner or operator may also utilize other temperature probes 26 dispersed across the landfill for the purpose of gathering temperature data on a broad scale to assess the extent of the subsurface reaction 24.

The temperature data from the probes 26 is analyzed to determine the extent, both horizontally and vertically, of the subsurface reaction 24 by evaluating temperatures that exceed, for example, 170° F., a temperature at which some experts believe indicates the existence of a subsurface reaction 24. In order to stop the advance of the heat front 22 the system 10 components, described in detail below, are installed proximate the advancing heat front and are situated so as to extract heat from the waste mass and thereby prevent the pyrolysis of the waste mass 18 that is closely situated to the advancing heat front 22. Removing heat from the advancing heat front 22 greatly diminishes the prospect that the material surrounding the heat removal system 10 will begin to experience pyrolysis.

Figure 2:
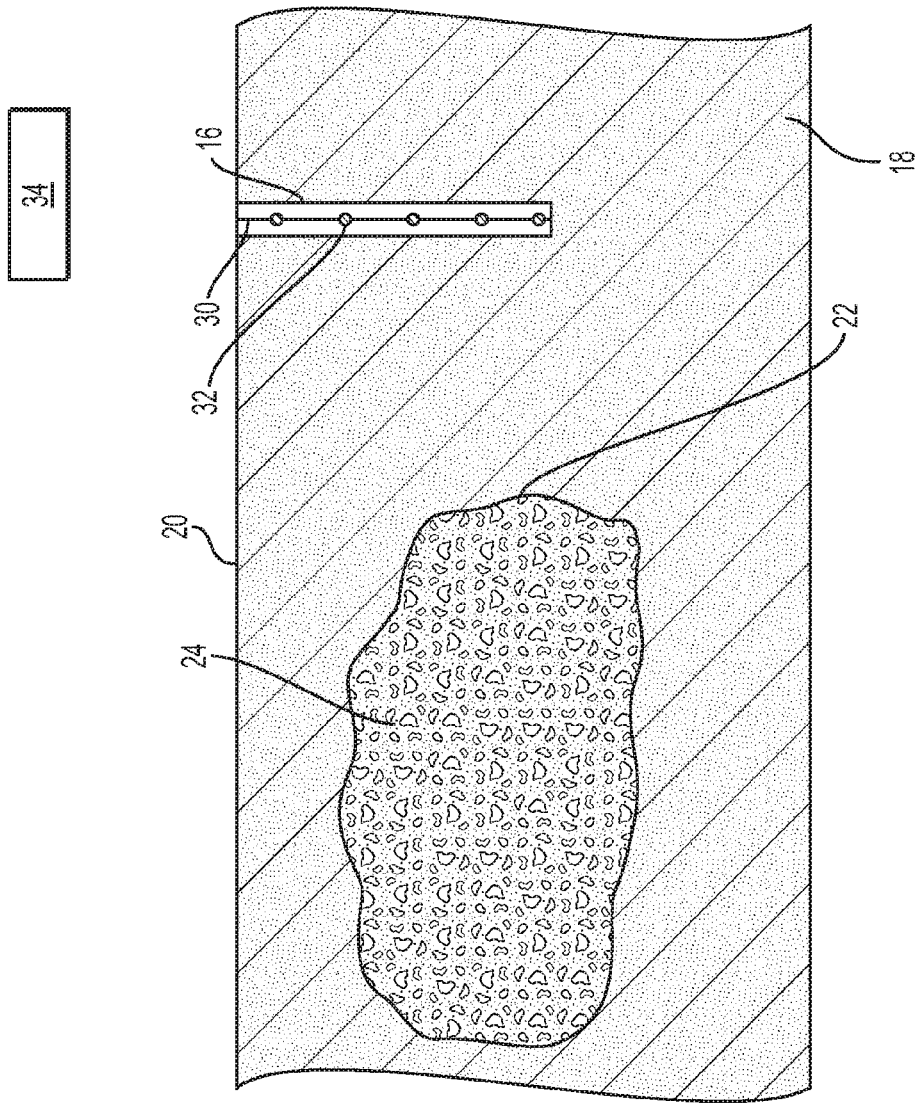
FIG. 2 is a sectional elevation view of a landfill waste mass boring and an embodiment of a subsurface reaction temperature measurement apparatus.

As seen in FIG. 2, the disclosed system 10 utilizes at least one temperature measurement apparatus 30 positioned within the boring 16 capable of measuring the temperature of the waste mass at discrete stratified depths below grade of the landfill 20. The temperature measurement apparatus 30 preferably consists of a plurality of longitudinally separated temperature monitoring probes 26. Borings 16 are placed into the landfill waste mass 18 wherein the borings are either proximate the subsurface reaction, or within the subsurface reaction itself. Typically the borings are accomplished by placing a circular plate with outwardly extending flanges at the bottom of a rigid metal casing. These outwardly extending flanges at the lower edge of the casing serve to bore through the waste mass as the casing is rotated into the waste mass by a drill rig.

Once the lower end of the casing arrives at the desired depth the casing is extracted a nominal distance and the circular plate with the outwardly extending flanges is forcibly removed, by techniques that are well known in the industry, from the bottom edge of the casing. Spaced apart temperature measurement probes 26, typically thermocouples, are secured to a rod and then inserted into the casing interior. Contemporaneous with the placement of the rod with the longitudinally spaced thermocouples into the casing, the casing is extracted from the bore hole, by the drill rig, and a grout mixture comprising Portland cement, water, bentonite, granular blast furnace slag, fly ash and a cement retardant is pumped into the bore hole thereby sealing the bore hole. The hardened grout mixture serves to stabilize the temperature probes in the waste mass and also to effectively transfer heat from the waste mass to the temperature probes 26.

The spacing of the temperature probes 26 is determined by the need for temperature data at discrete levels within the landfill. The probes 26 are linked to a data logger 34 that compiles the temperature readings at the various depths within the waste mass 18. Multiple temperature measurement apparatus 30 located around, and in some cases within the reaction 24 provides the landfill operator with critical data needed to evaluate the extent to which the subsurface reaction has advanced and how thermally intense the reaction has become.

Figure 3:
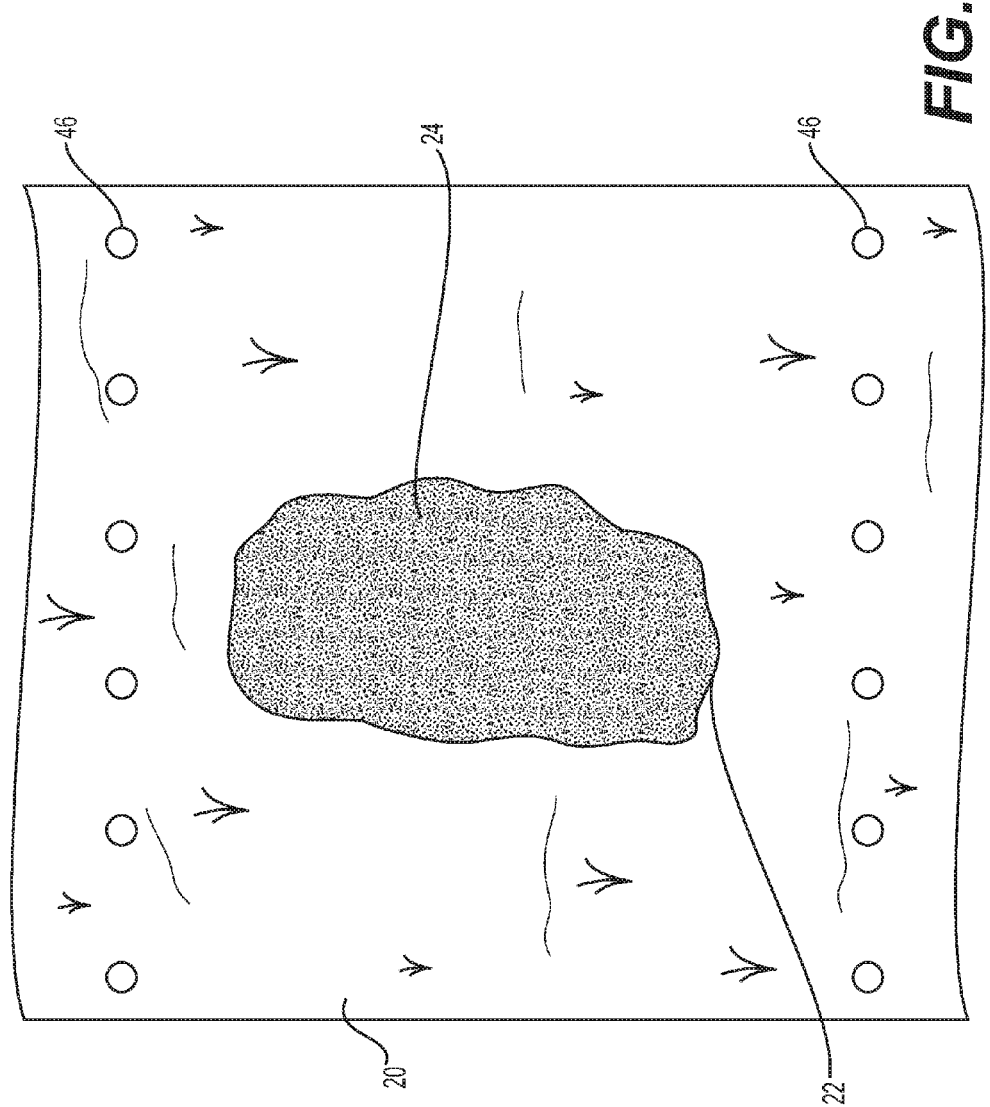
FIG. 3 is a plan view of an embodiment of a landfill subsurface reaction occurring between temperature measurement componentry.

FIG. 3 depicts a plurality of borings 46 distinct from the first set of borings 16 into which additional heat extraction system 10 components are installed. For the heat extraction components, the borings may be drilled larger than the rigid tubular casing or may be formed by direct driving the rigid tubular casing. The borings 46 are formed into a line, or alternatively a saw tooth configuration, preferably creating a boundary across which the advancing face 22 of the subsurface reaction 24 cannot readily pass thereby constraining the subsurface reaction 22 to a specified area of the landfill 20. Once constrained to a smaller area of the landfill the subsurface reaction 24 will eventually self-extinguish once all reaction materials in that limited area of the waste mass 18 have been consumed.

Figure 4:
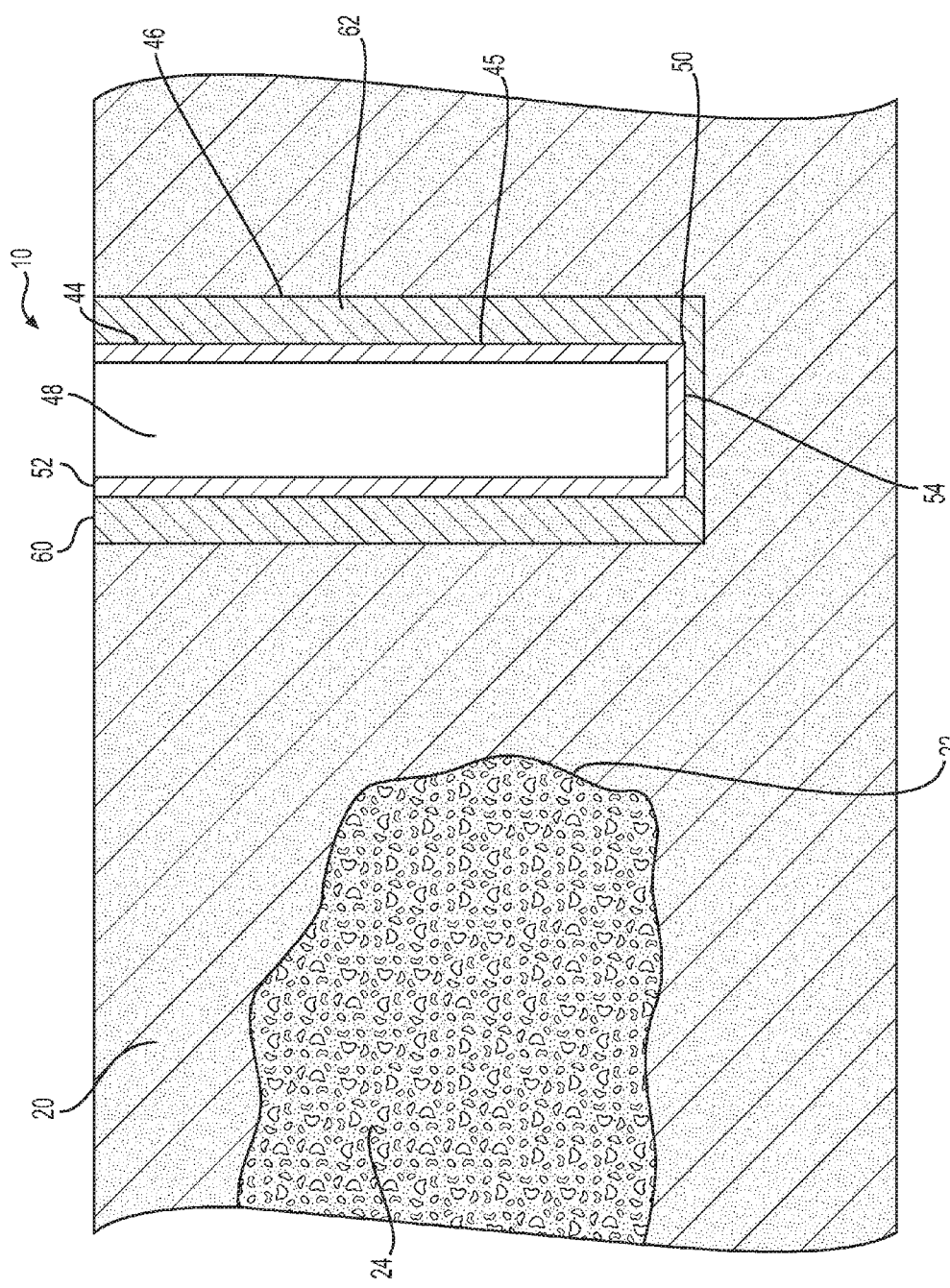
FIG. 4 is a sectional elevation view of an embodiment of a heat removal system embedded within the waste mass of a landfill proximate an advancing heat front of a subsurface reaction.

FIG. 4 details the installation of a rigid tubular casing 44, also referred to as a heat exchange unit, into the boring 46 in the landfill 20 waste mass 18 proximate the advancing face 22 of the subsurface reaction 24. The rigid tubular casing 44 includes an interior space 48, a lower edge 50 and an upper edge 52. The lower edge 50 of the casing 44 is disposed proximate the bottom surface of the boring 46 while the upper edge 52 of the casing 44 is disposed roughly flush with the surface of the landfill 20. The rigid tubular casing 44 is preferably fabricated from steel with a yield strength in excess of 40,000 psi. An exemplary casing material is 316 stainless steel which is an austenitic chromium nickel stainless steel containing molybdenum. The addition of these elements increases general corrosion resistance, improves resistance to pitting from chloride ion solutions, and provides increased strength at elevated temperatures. Corrosion resistance of 316 stainless steel is improved over a non-stainless steel casing, particularly as against sulfuric, hydrochloric, acetic, formic and tartaric acids; acid sulfates and alkaline chlorides, all of which may be found at some concentration in the leachate being generated by the subsurface reaction 24.

Importantly, the casing 44 must also have a wall 45 of sufficient thickness to resist the radial stresses applied by waste mass 18 due to the differential settlement of the landfill. Radial pressures exceeding the yield stress of the metal caused by differential settlement of the waste mass could cause a buckling of the casing 44 thereby limiting the capability of the cooling system 10. Moreover, large forces applied at a weld joining two sections of the casing 44 could result in a rupture of the weld integrity that would result in a continuous release of cooling fluid. Loss of the cooling fluid would rapidly degrade the system 10 performance or possibly even result in a complete shutdown should all cooling fluid be lost by leakage into the waste mass 18.

Casings 44 fabricated from polymers such as polyvinyl chloride, polyethylene or polypropylene would likely be unable to resist the high temperatures associated with the subsurface reaction and may experience considerable degradation of the component's structural integrity rendering the casing ineffective after a short duration exposure to the harsh environment of the subsurface reaction. Likewise, clay, ceramic and composite materials may be insufficiently tough and therefore unable to resist the loads applied by the landfill and will fracture.

The rigid tubular casing 44 may also be of different cross sectional shapes including circular, or rectangular, with a major cross section dimension D1. The preferred cross section of the casing 44 is circular due to the avoidance of corners that can present challenges to those installing the casing into a hole bored into the waste mass 18 and to allow the shifting waste mass to shear past the casing thereby limiting the application of a radial force to the casing. A rectangular casing presents a flat face to the shifting waste mass 18 and would likely experience the application of a normal (orthogonal) load to the surface of the casing causing a rectangular casing to experience a greater loading from the shifting waste mass than that experienced by a circular casing. In a preferred embodiment of the system 10, a schedule 40 casing with a four inch nominal diameter is utilized for the casing 44. A schedule 40 pipe of a nominal 4 inch diameter (major cross section dimension) includes a wall thickness of 0.237 inches and an inside diameter of 4.026 inches.

The tubular casing 44 extends downwardly into the waste mass preferably to a depth proximate the lowermost level of the subsurface reaction 24; however, lesser and greater depths may also be utilized depending upon the objectives of the heat extraction strategy that is to be employed. The casing 44 may alternatively be inserted directly into the subsurface reaction 24. The rigid casing 44 at the lowermost level of the waste mass is sealed with a metal cap 54 at the lower edge 50. The cap 54 is welded to the lower edge 50 in order to create a leak proof seal capable of preventing the release of the water based coolant into the waste mass 18.

Installation of the tubular casing 44 requires the boring of a hole 46 into the waste mass 18. The boring into the waste mass is accomplished by equipment and techniques that are well known in the industry. The bored hole 46 is of a greater than or equal diameter than the major cross section dimension D1 of the casing 44 to be installed and the bore hole 46 preferably ranges from 6 to 12 inches in diameter. Once the entire run of the casing 44 is installed into the bore hole 46 the annulus 60, if any, between the casing 44 and the circumference of the bored hole 46 must be backfilled to facilitate the transfer of heat from the subsurface reaction occurring within the waste mass 18. The backfill material 62 further serves to stabilize the casing 44 within the waste mass 18 and to buttress the casing 44 against forces applied to it from differential settlement of the waste mass due to the advancement of the heat front 22 into new areas of the waste mass.

The backfill material 62 is preferably comprised of a mixture containing Portland cement, water, bentonite, granular blast furnace slag, fly ash and a cement retardant. These materials, combined in the proper proportions exhibit excellent flow characteristics allow easy pumping into the annulus 60 and provide the desired thermal conductivity required by the design. The mixture hardens at a rate that is also manageable for the crew pumping the mixture into the annulus 60.

Figure 5:
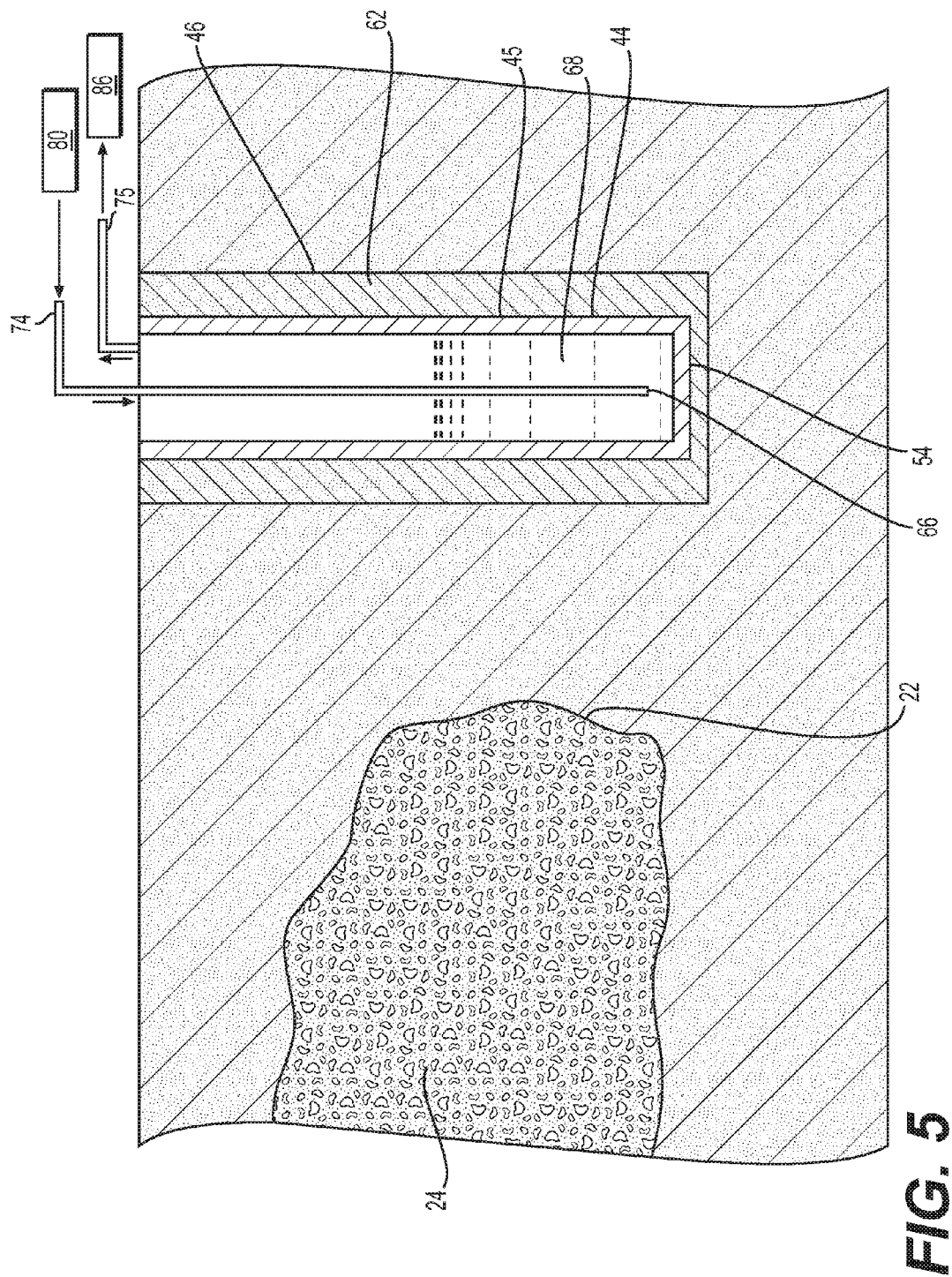
FIG. 5 is a sectional elevation view of an embodiment of a heat removal system embedded within the waste mass of a landfill proximate an advancing heat front of a subsurface reaction.

As shown in FIG. 5, inserted into the casing 44 is an inlet pipe 64 with a lesser diameter than the casing 44 that extends down to within a foot, or less, from the metal cap 54 and terminates at a discharge end 66. An inlet pipe 64 is one inch in diameter and comprised of, for example, 316 stainless steel; however, other inlet pipe diameters and pipe compositions may also be utilized. A once inch diameter inlet pipe 64 inserted into an eight inch diameter casing 44 will occupy only about 8 percent of the total area within the casing cross-section leaving sufficient area for cooling fluid 68 to flow within the casing 44 and absorb heat 70 through the wall 45 of the casing 44. The end of the inlet pipe 64 that is opposite the discharge end 66 is the intake end 74.

Through the intake end 74 of the inlet pipe 64 the cooling fluid 68 is pumped causing the casing 44 to flood cooling fluid starting at the bottom of the casing near the cap 54. As cooled fluid 68 exits the inlet pipe 64, near the cap 54 at the discharge end 66, the fluid 68 rises to the top of the casing 44 by the pressure exerted upon it by the cooling fluid 68 immediately discharged behind it from the inlet pipe 64. As the cooling fluid 68 rises to the top of the casing 44, heat is exchanged from the surrounding waste mass, through the grout (if present) and the exterior pipe wall to the circulating fluid.

FIG. 5 further reveals that as the cooling fluid flows upward from the discharge end 66 within the casing 44, heat transfers by conduction from the casing wall 45 to the cooling fluid 68 until finally the fluid is discharged at the top of the casing to a discharge pipe 72 to restart recirculation of the cooling fluid through the entire system 10. The discharge pipe 72 routes the cooling fluid 68 to the heat exchanger 86 for ejection of heat 70. This heat transfer process moving energy from the waste mass 18 to the cooling fluid 68 can substantially decrease, or even halt, the pyrolitic action occurring within the subsurface reaction 24.

The cooling fluid 68 is driven through the inlet pipe 64 by a standard commercial fluid pump 80 that is properly sized for the flow rate of cooling fluid needed to remove the calculated amount of energy from the subsurface reaction 24 in conjunction with the size of the heat exchanger 86. The pump 80 may be situated at many different locations within the closed loop circulating system to achieve the desired purpose. For example, the pump 80 may be situated within, immediately prior to, or immediately after, the heat exchanger 86, or alternatively, after the cooling fluid 68 exits the casing 44. The location of the pump 80 may be dependent upon the availability of a connection to electrical power, elevation relative to other system 10 components such as the heat exchanger 86, adequate protection from the weather and a location that is unaffected by traffic, or heavy machinery, transiting the landfill 20.

The heat exchanger 86 serves the critical purpose of ejecting heat from the cooling fluid 68 as the fluid passes through the heat exchanger. Heat exchangers utilize different heat transfer mechanisms including: 1) dry cooling towers that operate by heat transfer through a surface that separates the working fluid from ambient air, such as in a tube to air heat exchanger, utilizing convective heat transfer; 2) wet cooling towers (or open circuit cooling towers) operate on the principle of evaporative cooling. The working fluid and the evaporated fluid (usually water) are one and the same; 3) fluid coolers (or closed circuit cooling towers) are hybrids that pass the working fluid through a tube bundle, upon which clean water is sprayed and a fan-induced draft applied; 4) chillers that use a refrigerant to cool the liquid, or some combination of the four described above. The resulting heat transfer performance is much closer to that of a wet cooling tower, with the advantage provided by a dry cooler of protecting the working fluid from environmental exposure and contamination.

As discussed above, the adverse impacts of a subsurface reaction 24 in a solid waste landfill 20 can include odors, fugitive emissions, liner or cap damage, gas and leachate management structural damage, slope failure, ground water and/or surface water impacts, differential settlement; and disruption of landfill operations. As such, it is to the advantage of the landfill owner and operator to halt, or at least minimize the impacts of a subsurface reaction. The disclosed system is capable of removing heat from the waste mass and halting the progress or at least decrease the rate of advance of the heat front 22.

To properly align the system 10 capabilities with the subsurface reaction 24, the landfill owner or operator will generally need to understand the character and extent of the subsurface reaction 24. It is important in the design of the system 10 to know, with some level of precision, the temperature of the subsurface reaction at various depths. It is also very beneficial when designing, and sizing the system components, to know the extent of the subsurface reaction 24. To accumulate that information will require the installation of temperature monitoring probes 26 across the landfill 20 and at various depths below grade in order to determine the extent and temperature of the subsurface reaction 24. Temperatures exceeding 170° F. generally signify the existence of a subsurface reaction; however, temperatures in subsurface reactions can and do exceed 250° F.

Once temperature data and the dimensional expanse of the subsurface reaction 24 is determined from analysis of the monitoring probe 26 data this information, in conjunction with the diameter of the rigid tubular casing 44, the bore hole diameter 46, the thermal conductivity of the waste mass 18, the thermal conductivity of the backfill material 62, and the anticipated energy extraction rate, generally measured in kilowatts and other landfill parameters are entered into modeling software, such as FEFLOW (Finite Element subsurface FLOW system) which is used for simulating heat transfer in porous and fractured media. The output of the finite element model and the capacity to perform multiple runs of the program with varying parameters at a low relative cost will facilitate the process of sizing and spacing of the rigid casing 44, the flow rate of the cooling fluid 68, the pump 80 sizing and very importantly the capacity and overall capabilities of the heat exchanger 86.

Failure to model the subsurface reaction does not necessarily suggest that the installed system 10 will fail to accomplish an arresting of the subsurface reaction 24. Modeling does; however, increase the likelihood that the system 10 will be sufficiently robust and capable of addressing the energy extraction requirements that are necessary to halt the advance of the heat front 22 that can lead to additional adverse impacts upon the landfill.

Figure 6:
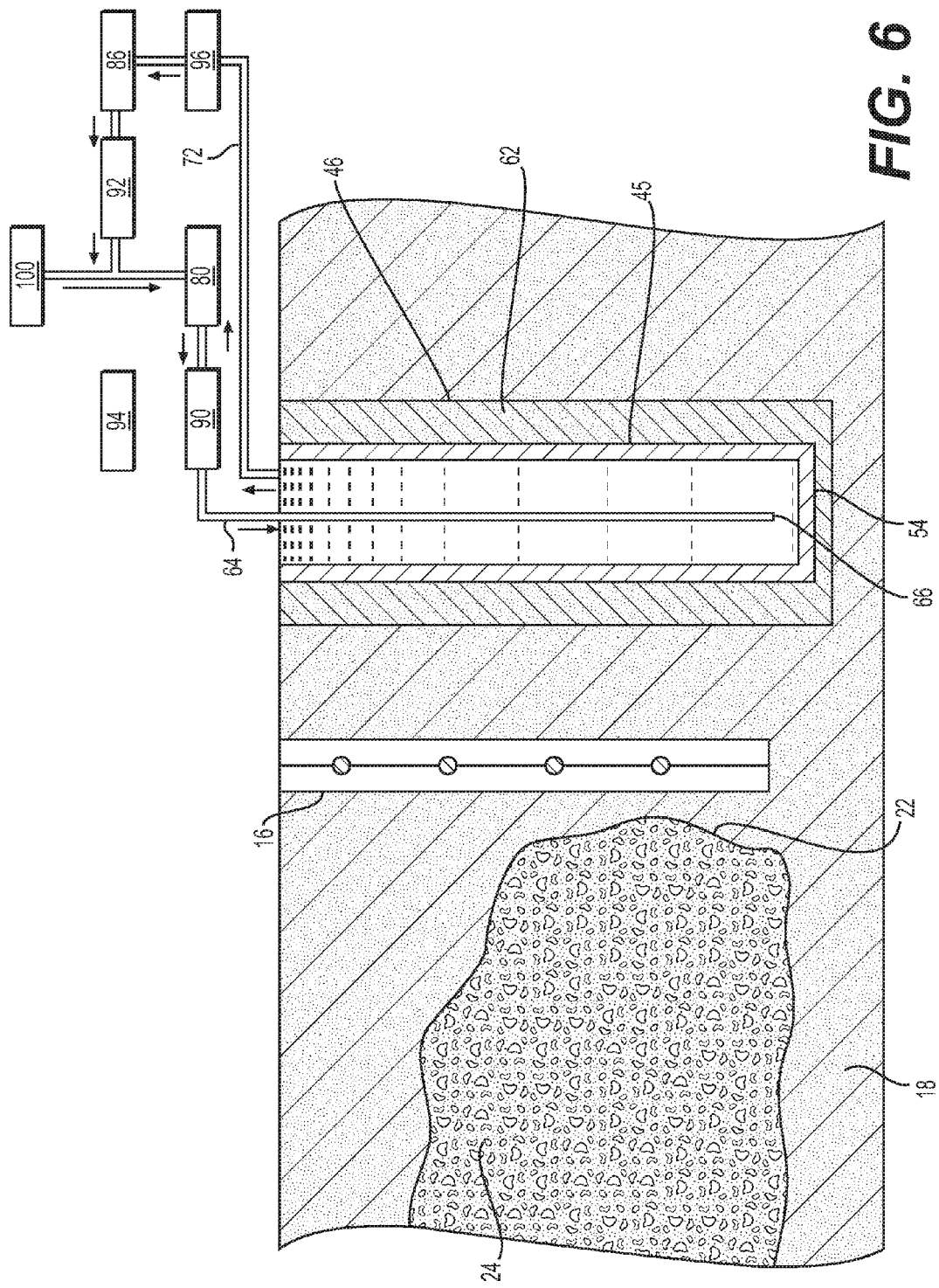
FIG. 6 is a sectional elevation view of an embodiment of a heat removal system embedded within the waste mass of a landfill proximate an advancing heat front of a subsurface reaction.

In operation, and as shown at FIG. 6, the system 10 comprises an appropriately sized pump 80 for circulating the cooling fluid 68 into the intake end 74 of the inlet pipe 64. The discharge end 66 of the inlet pipe 64 is positioned close to the cap 54 which seals the lower edge 50 of the casing 44 sending the cooling fluid 68 into the interior space 48 of the casing. Once the interior space 48 is filled the excess cooling fluid is discharged through the discharge pipe 72 that is operably coupled to the upper edge 52 of the casing 44. As additional cooling fluid is discharged from the discharge end 66 of inlet pipe 64 it forces the previously discharged fluid to the upper edge 52 of the casing 44.

The cooling fluid 68 is routed through the discharge pipe 72 to the heat exchanger 86 which ejects the heat energy from the cooling fluid. Once the cooling fluid passes through the heat exchanger it is moved by the pump 80 into the inlet pipe 64 where it once again enters the interior space 48 of the casing 44 to again extract heat from the subsurface reaction 24 within the waste mass 18.

The system 10 also incorporates a flow meter 90 that measures the rate of flow of the cooling fluid 68 as well as a temperature measurement unit 92 to capture the temperature of the cooling fluid exiting the heat exchanger 86. The flow rate as well as the temperature exiting the heat exchanger is stored in a data logging system 34 at a predetermined recurring time interval. The system 10 further includes a temperature measurement unit 94 for measuring the temperature of the cooling fluid prior to entering the heat exchanger 86. This temperature data is stored in the same data logging system 34. The frequency of the temperature measurement at both units 92, 94 are determined by the level of data that is sought by the system operator to calculate energy removal rates.

The system 10 further employs computational capabilities to calculate, at some predetermined frequency, the difference between the temperature of the cooling fluid entering the heat extraction wells and exiting the heat extraction wells. The heat energy ejected from the cooling fluid 68 by the heat exchanger 86 is calculated from the difference between the temperature of the cooling fluid entering and exiting the heat exchanger multiplied by the rate of fluid flow to the heat exchanger. As temperature and flow rate data is available within the data logging system 34, a system computer 98 calculates the amount of heat energy ejected from the cooling fluid by multiplying the flow rate and temperature difference for a specified period of time for each heat extraction well.

One additional component that may be employed within the system 10 is an equalization tank 100. The equalization tank 100 serves to further moderate the temperature of the cooling fluid 68 by providing a large reservoir into which the cooling fluid is pumped following removal from the casing 44. The equalization tank 100 facilitates ejection of heat by natural conduction and convection to the atmosphere during certain weather conditions. The ejection of heat by natural convection and conduction to the atmosphere lowers the temperature of the cooling fluid within the equalization tank thereby assisting the role of the heat exchanger 86. The cooling fluid 68 is withdrawn from the equalization tank 100 and then pumped into the heat exchanger 86 where additional heat is withdrawn before the cooling fluid 68 is returned to casing 44 for additional extraction of heat from the subsurface reaction or area of elevated temperature 24.

Figure 7:
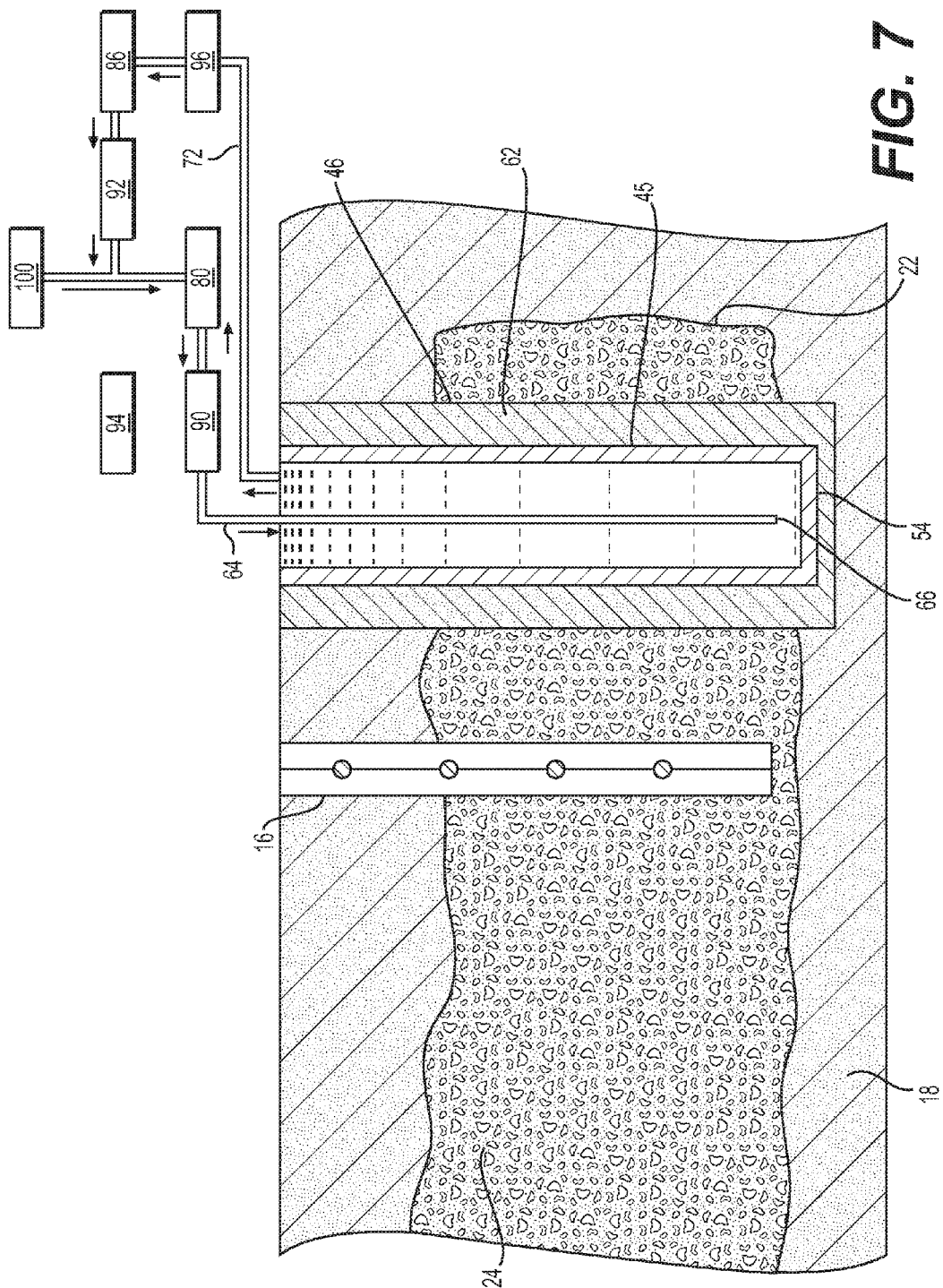
FIG. 7 is a sectional elevation view of an embodiment of a heat removal system embedded within a landfill subsurface reaction.
Figure 8:
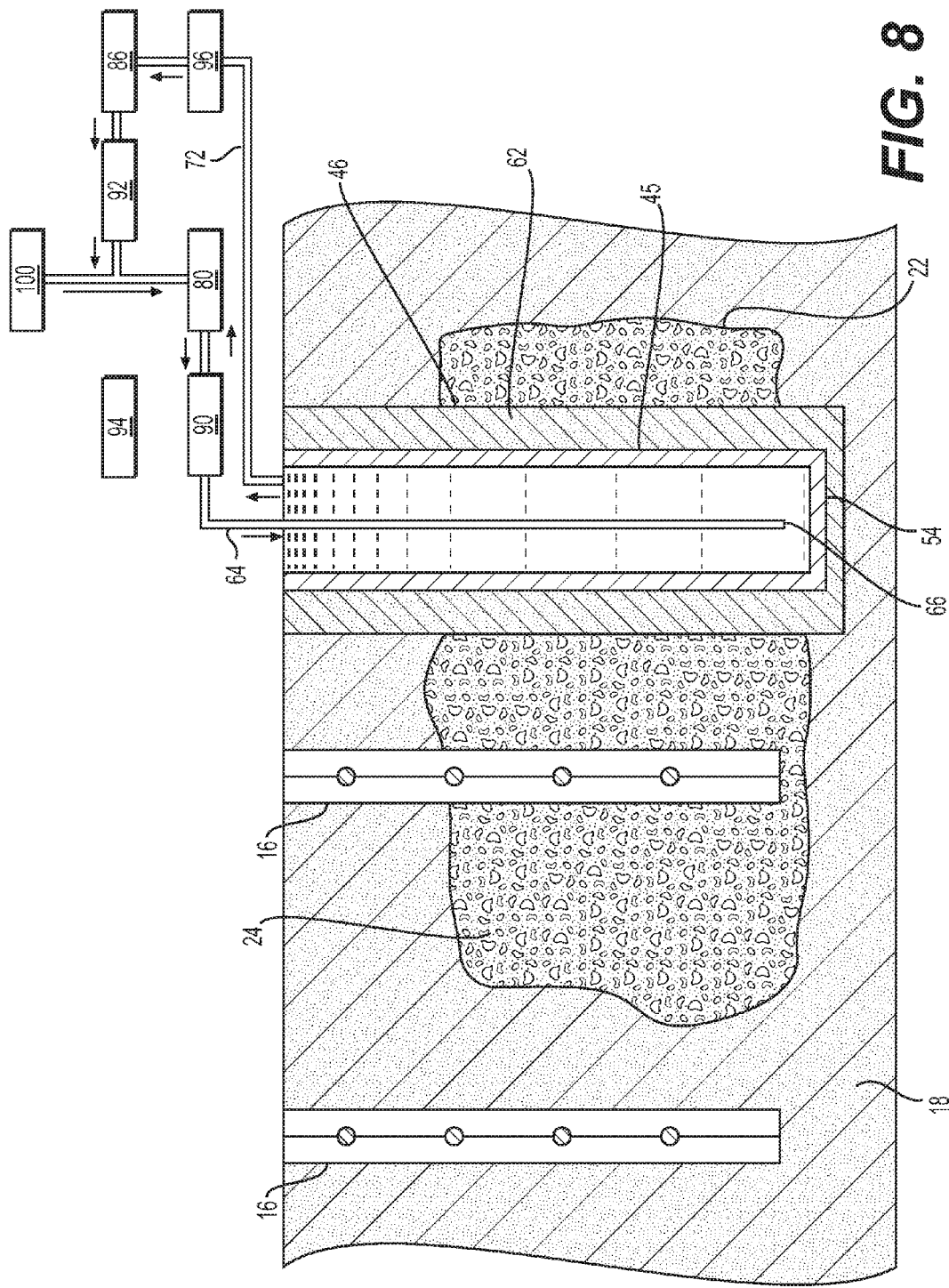
FIG. 8 is a sectional elevation view of an embodiment of a heat removal system embedded within a landfill subsurface reaction.

FIG. 7 details an alternative placement of the rigid casing 44 and the temperature monitoring probes 16 embedded within the subsurface reaction 24. This placement of the casing and temperature probes is an alternative scenario to that shown in FIG. 6 that may result in the best approach for retarding the advance of the heat front 22. As discussed above, the computer simulation using a numerical modeling program, such as FEFLOW™, may generate a solution for retarding the movement of the heat front that requires placement of the casing 44 and the heat probes in the subsurface reaction 24. FIG. 8 details yet another option for retarding the advance of the heat front and that includes placement of the rigid casing 44 and one or more temperature probes 16 into the subsurface reaction 24 and also placing one or more temperature probes 16 outside of the subsurface reaction and within the waste mass presently not impacted by the reaction.

While the preferred form of the present invention has been shown and described above, it should be apparent to those skilled in the art that the subject invention is not limited by the figures and that the scope of the invention includes modifications, variations and equivalents which fall within the scope of the attached claims. Moreover, it should be understood that the individual components of the invention include equivalent embodiments without departing from the spirit of this invention.

It will be understood that certain features and subcombinations are of utility and may be employed without reference to other features and subcombinations and are contemplated within the scope of the claims. Not all steps listed in the various figures need be carried out in the specific order described.

I claim:

1. A system for preventing, or mitigating, a subsurface reaction within a landfill waste mass, the system comprising:
    at least one rigid tubular casing with an interior space, a lower edge and an upper edge, the at least one rigid tubular casing extending downwardly into the waste mass to a depth proximate the subsurface reaction, the rigid tubular casing at the lower edge sealed with a cap;
    at least one inlet pipe of a lesser cross sectional major dimension than the rigid tubular casing, the inlet pipe having a discharge end for discharging a circulating cooling fluid and an intake end for intake of the circulating cooling fluid, the discharge end of the inlet pipe inserted into the rigid tubular casing proximate the cap;
    at least one discharge pipe spaced apart from the inlet pipe, the discharge pipe being operably coupled to the upper edge of the at least one rigid tubular casing for removing the circulating cooling fluid in excess of the capacity of the interior space of the at least one rigid tubular casing;
    a heat exchanger for ejecting heat from the circulating cooling fluid entering the heat exchanger from the discharge pipe; and
    a pump for circulating the cooling fluid between the at least one rigid tubular casing and the heat exchanger.

2. The system of claim 1, wherein the cooling fluid recirculates within the system.

3. The system of claim 1, wherein the at least one rigid tubular casing is circular or rectangular in cross section.

4. The system of claim 1, wherein the at least one rigid tubular casing is comprised of metal.

5. The system of claim 4, wherein the tubular casing is comprised of metal with a yield strength and a wall thickness sufficient to resist deformation due to the application of radial forces resulting from differential settlement of the waste mass.

6. The system of claim 1, wherein the at least one rigid tubular casing is comprised of at least two longitudinally extending sections of tubular casing.

7. The system of claim 1, wherein the at least one rigid tubular casing is comprised of a plurality of longitudinally extending casing sections welded together at the lower edge of a first section and the upper edge of a second section.

8. The system of claim 1, wherein the at least one tubular casing is inserted into the waste mass and the boring is at least the diameter of the rigid tubular casing.

9. The system of claim 8, wherein when the tubular casing is inserted into the boring an annulus is formed between the boring circumference and an exterior surface of the casing.

10. The system of claim 9, wherein the annulus is backfilled with a conductive grout.

11. The system of claim 1, wherein the waste mass undergoing the subsurface reaction has a temperature in the range of from 170° F. to 400° F.

12. The system of claim 1, wherein the boring descends into the waste mass in the range of from about 15 to 500 feet below grade.

13. The system of claim 1, wherein the cap is welded to the lower edge of the rigid tubular casing forming a liquid tight seal.

14. The system of claim 1, wherein the discharge end of the at least one inlet pipe is separated from the cap by a distance in the range of from about 1 to 12 inches.

15. The system of claim 1, wherein a flow meter measures the rate of flow of the cooling fluid circulating within the system.

16. The system of claim 1, wherein the temperature of the cooling fluid exiting the heat exchanger is measured and the temperature value is stored in a data logging system.

17. The system of claim 16, wherein the temperature of the cooling fluid entering the heat exchanger is measured and the temperature value is stored in a data logging system.

18. The system of claim 17, wherein the difference between the temperature of the cooling fluid entering the heat exchanger and the temperature of the cooling fluid exiting the heat exchanger is calculated by a computer operably coupled to the data logging system.

19. The system of claim 18, wherein the cooling fluid experiences a thermal energy reduction upon circulating through the heat exchanger, the thermal energy reduction is calculated from the difference between the temperature of the cooling fluid after exiting the casing and after exiting the heat exchanger multiplied by the rate of fluid flow to the heat exchanger.

20. A system for preventing, or mitigating, a subsurface reaction within a landfill waste mass, the system comprising:
    at least one boring descending into the waste mass wherein the boring is at least one of (1) embedded within the waste mass proximate the subsurface reaction, or (2) embedded within the subsurface reaction;
    a plurality of temperature measurement apparatus positioned within the boring capable of measuring the temperature of the waste mass at specified depths below grade;
    at least one rigid tubular casing with an interior space, a lower edge, and an upper edge, the rigid tubular casing extending downwardly into the waste mass, the rigid tubular casing at the lower edge sealed with a cap;

at least one inlet pipe comprising a discharge end and an intake end, the discharge end inserted into the rigid tubular casing proximate the cap;

a pump for pumping a cooling fluid through the at least one inlet pipe, wherein the cooling fluid flows into the at least one rigid tubular casing from the discharge end of the inlet pipe thereby filling the interior space wherein excess cooling fluid, beyond the capacity of the interior space, flows into a discharge pipe operably coupled to the upper edge of the at least one rigid tubular casing; and a heat exchanger for ejecting heat from the cooling fluid traveling through the discharge pipe.

21. The system of claim 20, wherein the at least one temperature measurement apparatus is comprised of a plurality of longitudinally separated temperature monitoring probes.

22. The system of claim 20, wherein the cooling fluid is comprised of a water-based composition.

23. The system of claim 20, wherein the landfill waste mass is evaluated with at least one numerical heat removal simulation prior to installation of the system in order to determine the operational requirements of the system.

24. A method for preventing, or mitigating, a subsurface reaction within a landfill waste mass, the method comprising:

boring a plurality of laterally spaced temperature measurement holes into the waste mass wherein the boring is at least one of (1) within the waste mass proximate the subsurface reaction, or (2) within the subsurface reaction;

installing a temperature measurement apparatus capable of measuring waste mass temperature at discrete depths below grade into each bored hole in the waste mass, wherein the step of installing the temperature measurement apparatus into each bored hole further comprises the placement of a temperature measurement apparatus casing into each bored hole, a rod with a lesser diameter than the temperature measurement apparatus casing and with longitudinally spaced thermocouples secured thereto is then positioned within the temperature measurement apparatus casing, and contemporaneous with the placement of the rod into the temperature measurement apparatus casing, the temperature measurement apparatus casing is extracted from the bore hole and a grout mixture comprising Portland cement, water, bentonite, granular blast furnace slag, fly ash and a cement retardant is pumped into the bore hole thereby sealing the bore hole and securing the temperature measurement apparatus in position within the waste mass;

measuring the temperature of the waste mass at the discrete depths with the temperature measurement apparatus; wherein the measuring of the temperature of the waste mass at the discrete depths with the probes proximate the advancing face of the reaction is followed by a recording of the temperature values at each discrete depth below grade and the temperature gradient proximate the advancing face of the reaction is determined;

performing heat transport modeling simulations utilizing landfill and landfill waste mass parameters to determine placement of at least one rigid tubular casing, the rigid tubular casing further comprising a casing wall, a lower edge, an upper edge, a cap secured to the lower edge, and an interior space, wherein the landfill and landfill waste mass parameters comprise casing wall thermal conductivity, waste thermal conductivity, waste heat capacity, grout mixture thermal conductivity, landfill dimensional data, surrounding geologic material parameters, liquid levels and flow gradient, heat exchange unit borehole parameters, porosity with respect to flow and porosity with respect to heat and the magnitude of internal heat generation of the landfill waste mass;

boring a hole into the waste mass wherein the bored hole is located in at least one of (1) within the waste mass adjacent the subsurface reaction, or (2) directly into the subsurface reaction;

installing the rigid tubular casing into the bored hole, backfilling an annulus created between the bored hole and the rigid tubular casing wall with backfill material;

inserting a discharge end of an inlet pipe into the interior space of the at least one rigid casing proximate the cap secured to the lower edge;

delivering a cooling fluid into the interior space through a discharge end of an inlet pipe;

discharging excess cooling fluid from the interior space into a discharge pipe spaced apart from the inlet pipe;

conveying the discharged cooling fluid in the discharge pipe to a heat exchanger for ejecting heat energy from the cooling fluid;

calculating a flow rate of the cooling fluid;

measuring the temperature of the fluid prior to and after ejection of heat by the heat exchanger;

calculating and recording the heat energy ejected by the heat exchanger by multiplying the cooling fluid flow rate by the temperature difference before and after entering the heat exchanger; and recirculating the heat transfer fluid through the heat exchanger, the inlet pipe and the discharge pipe with a pump.

25. The method of claim 24, wherein the step of boring a plurality of laterally spaced temperature measurement holes into the waste mass further comprises the utilization of a circular plate secured to a lower edge of the rigid tubular casing, wherein the circular plate includes a series of outwardly extending flanges configured to bore through the waste mass.

26. The method of claim 25, wherein the drill bit plate further comprises a circular plate secured to the bottom of the rigid tubular casing with a plurality of downwardly extending flanges for boring through the waste mass.

27. The method of claim 24, wherein the measuring of the temperature of the waste mass at the discrete depths with the probes proximate the advancing face of the reaction includes longitudinally separating the thermocouples secured to the rod by a distance in the range of from about 1 to 50 feet.

28. The method of claim 24, wherein the rigid tubular casing is watertight such that the cooling fluid cannot enter the annulus.

29. A system for preventing, or mitigating, an area of elevated temperature within a landfill waste mass, the system comprising:

at least one water tight heat exchange unit with a lower edge and an upper edge, wherein the placement of the heat exchange unit is at least one of (1) within the waste mass proximate the area of elevated temperature, or (2) within the area of elevated temperature, the at least one heat exchange unit fabricated to resist differential settlement forces within the landfill as well as the elevated temperatures;

a piping system configured to discharge a cooling fluid within the at least one water tight heat exchange unit proximate the lower edge of the heat exchange unit and to extract the cooling fluid proximate the upper edge;

a heat exchanger for ejecting heat from the cooling fluid extracted from the at least one heat exchange unit and delivered to the heat exchanger by the piping system;

at least one temperature probe configured to measure the temperature of at least one of (1) an area within the elevated temperature, or (2) an area within the waste mass proximate the area of elevated temperature; and a pump adapted to circulate the cooling fluid within the piping system and the at least one water tight heat exchange unit.

30. The system of claim 29, wherein a computer program is configured to facilitate a determination of the optimal placement within the waste mass of the at least one water tight heat exchange unit, the computer program configured to operate upon a plurality of landfill and landfill waste mass specific parameters.

31. The system of claim 30, wherein the landfill and landfill waste mass specific parameters comprise heat exchange unit thermal conductivity, waste mass thermal conductivity, waste mass heat capacity, landfill dimensional data, geologic material parameters, landfill liquid levels and flow gradient, heat exchange unit borehole parameters, porosity with respect to flow and porosity with respect to heat and the magnitude of internal heat generation of the waste mass.

* * * * *